United States Patent [19]

Pirtle

[11] 4,000,495
[45] Dec. 28, 1976

[54] SYSTEM FOR RECORDING INFORMATION ON A PHOTOSENSITIVE MATERIAL

[76] Inventor: William W. Pirtle, 5517 Mason Ave., Woodland Hills, Calif. 91364

[22] Filed: Nov. 25, 1974

[21] Appl. No.: 526,966

[52] U.S. Cl. .............................. 354/7; 346/107 R; 354/5
[51] Int. Cl.² ...................................... G03B 15/00
[58] Field of Search ............................ 354/12, 5–7; 346/107 R; 178/15

[56] References Cited
UNITED STATES PATENTS

| | | | |
|---|---|---|---|
| 3,027,219 | 3/1962 | Bradley | 346/110 |
| 3,029,717 | 4/1962 | Hildebrandt | 346/107 X |
| 3,142,235 | 7/1964 | Siegmund | 355/1 |
| 3,832,488 | 8/1974 | Fahey et al. | 178/15 |
| 3,850,517 | 11/1974 | Stephany | 354/12 |

Primary Examiner—John Gonzales
Attorney, Agent, or Firm—Robert E. Geauque

[57] ABSTRACT

A system for recording information on a photosensitive material comprising an array of light emitting diodes; fiber optic tubes, coupled between said light emitting diodes and the photosensitive material; and computer means for controlling the excitation of said array of light emitting diodes such that as said photosensitive material is passed by the output ends of said fiber optic tubes, information is recorded a line at a time. The system is further characterized in that the size of the light emitting diodes and the configuration of their array are independent of the spot size and configuration of the light pattern applied to photosensitive material, and by a simplified circuit arrangement for the timing control of the array of light emitting diodes.

7 Claims, 6 Drawing Figures

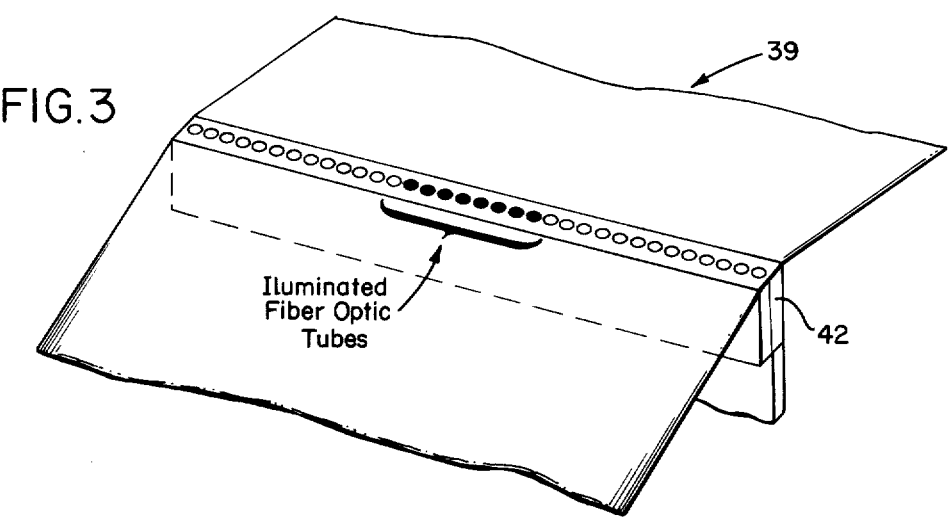
FIG. 3
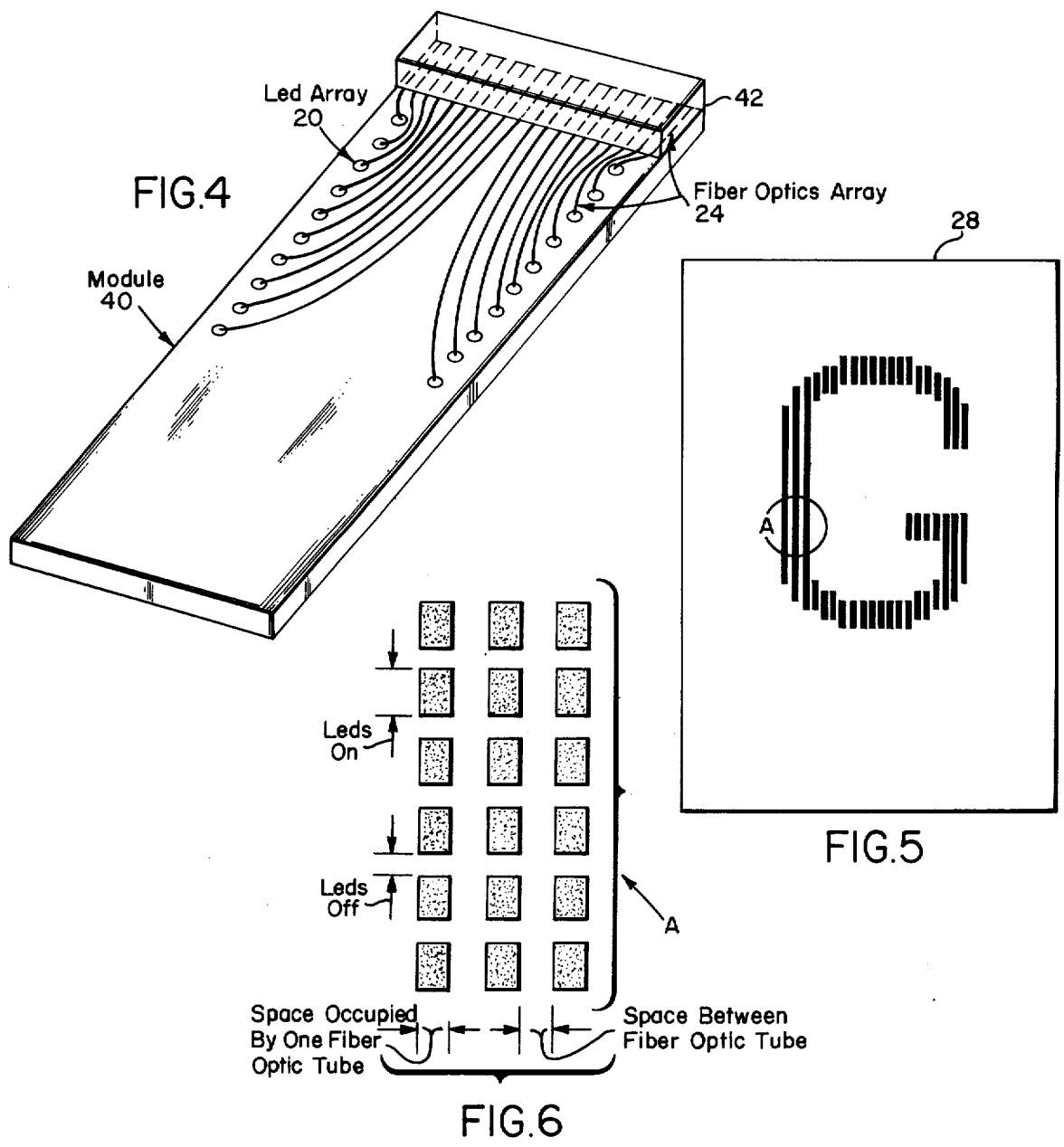
FIG. 4
FIG. 5
FIG. 6

SYSTEM FOR RECORDING INFORMATION ON A PHOTOSENSITIVE MATERIAL

FIELD OF THE INVENTION

This invention relates to systems for recording information on photosensitive material and particularly to such systems adapted for use to set type or for making a recording oscillograph.

DESCRIPTION OF THE PRIOR ART

One application for the subject invention is in the field of electronic typesetting which at present employs a variety of techniques such as the use of a transparency of the letter to be set, a light source, and a means of focusing the image upon the film or photosensitive paper. A typical application of this method would have all the letters and symbols of one or more fonts arranged around a transparent drum. The drum is rotated at a reasonably high speed. A light source of very short time duration is caused to illuminate the transparency and expose the film. Both the lens system and the position of the film are manipulated so that the letter will be placed in the desired spot on the film. Although this method has served the industry well, it is slow by present standards, being limited to perhaps less than one hundred lines of type setting per minute. Additionally, it is difficult and time consuming to change type fonts, as is usually required in the trade. Other objections to the system are difficult timing problems and the limited quality of the set type.

Some of the above outlined problems have been overcome by the system of U.S. Pat. No. 3,693,516 which uses a fiber optics bundle to assist image projection; however, the speed of even this system is limited by the need for projecting one character at a time from a mechanically positioned film record and the quality of the set type may be limited. U.S. Pat. Nos. 3,701,990; 3,458,655 and 3,496,846 also disclose systems which use fiber optics to tansmit energy to a moving film.

Another method of electronic typesetting makes use of the cathode ray tube (CRT). The CRT is controlled by a computer in such a manner that a whole line of type can be placed upon the CRT screen. This line of type is then focused upon the film, which is either stationary or moving, as required. The CRT system overcame some of the limitations of the transparency system, with the greatest improvement coming in the area of speed; and CRT systems can set small point size type at the rate of about one thousand lines per minute. By use of the computer and sufficient storage or memory, fifty or more different fonts can be utilized at will. The limitations of the CRT system of typesetting are reliability of operation and relatively poor quality of the set type. An inherent limitation of the CRT is that its electron beam can be only in one place at the time. This requires that the data be handled in serial fashion rather than the faster parallel fashion.

U.S. Pat. No. 3,512,158 discloses a printer which uses a rectangular array of infra-red energy emitting diodes for recording information on a heat sensitive paper. However, it is anticipated that the speed of such a system would be limited by its implementation whereby only a single character is recorded at a time, and its quality may be restricted by the optical lens system used to project the infrared energy onto the heat sensitive paper.

U.S. Pat. No. 3,803,631 discloses the broad concept of using light emitting diodes (LEDs) to record on a photosensitive medium; and U.S. Pat. No. 3,438,057 teaches the use of LEDS in an oscillographic type trace on photosensitive film.

U.S. Pat. Nos. 3,534,179 disclose LED systems for respectively recording information onto and reading the information from photosensitive material, such as the voice track of motion picture film.

SUMMARY OF THE INVENTION

A primary object of the invention is to provide an improved information recording system which overcomes the speed and quality limitations of prior art systems.

A more specific object of the invention is to provide an improved high quality, high speed typesetting system.

A further object of the invention is to provide an improved high speed typesetting system which can readily accommodate a large variety of type fonts and type sizes, as well as logos, symbols and half tone pictures.

In accordance with the present invention, these objects are accomplished by a computer controlled array of light emitting diodes (LEDs) which are coupled to a photosensitive material by means of fiber optic tubes. As a photosensitive material is passed by the output ends of the fiber optic tubes information is readout a line at a time; and the timing control of the LEDs is simplified by use of a single gating circuit in series with one terminal of each of the LEDs.

Increased operational speed results from the parallel printing format and the rapid response of the LEDs. Improved resolution results from the lack of problems associated with prior art lens type focusing arrangements and by the independence between the configuration of the LED array and the output configuration of the fiber optic tube. In accordance with the present invention, the diameter of the output ends of the fiber optic tube may be quite small, such as 0.002 inches for example, while the LED elements may be as large as required to produce high level light drive signals, such as 0.025 inches for example. Since the configuration of the LEDs and the output ends of the fiber optic tubes are independent of one another, the LED array may be arranged to optimize the packaging of the electronic elements; while the input ends of the fiber optic tubes may be arranged in an entirely different configuration which improves image quality and simplifies the control program for the LEDs. For example, a system for setting ten inch columns of type may comprise a linear array of 5,000 fiber optic tubes of 0.002 inch diameters.

BRIEF DESCRIPTION OF THE DRAWINGS

The foregoing and other objects and features of the present invention can be more readily understood with reference to the following detailed description taken in conjunction with the accompanying drawings, wherein like reference numerals designate like elements and in which:

FIG. 3 is a perspective diagram which illustrates the relationship between the output ends of the fiber optic tubes and the photosensitive material;

FIG. 4 is a perspective diagram which depicts the arrangement of the LED array and the fiber optics array;

FIG. 5 is an illustration of a letter which is useful for explaining how the computer of FIG. 1 may be programmed to set type; and FIG. 6 shows an area of the letter of FIG. 5 at an enlarged scale for explaining how characters are formed by systems in accordance with the subject invention.

DETAILED DESCRIPTION OF THE INVENTION

Figure 1:
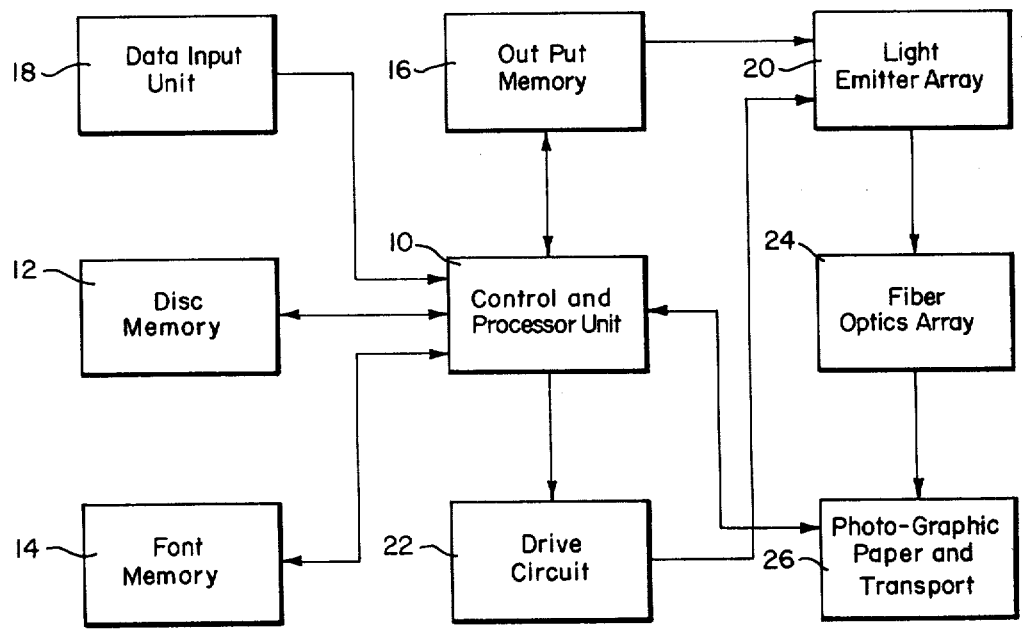
FIG. 1 is a block diagram of a typesetting system in accordance with the present invention.

In the embodiment of the invention shown in FIG. 1, a computer arrangement includes a main control and processor unit 10, a disc memory 12, a font memory 14 and an output memory 16. The operation of computer processor unt 10 is controlled by instructions supplied from a data input unit 18 which may be a paper or magnetic tape type of program input unit, for example.

The excitation of an array of light emitting diodes (LEDs) 20 is controlled by data signals from output memory 16 and the timing of LED array 20 is coupled to a photosensitive material by means of a fiber optics array 24. The photosensitive material is driven past the output ends of the fiber optics array by a transport unit 26 which is controlled by computer processor unit 10.

The information defining type fonts, logos, symbols and half tone pictures to be set by the system are stored in disc memory 12. One method of data handling which can be used to load disc memory 12 will now be described with reference to FIGS. 5 and 6. In accordance with this method, a piece of transparent plastic, which has horizontal and vertical grid lines is placed over a large reproductions of the character, such as the letter G of FIG. 5, for example. By identifying each square on the transparency, an address for each square may be generated, and by observing the letter through the transparency data can be listed for each square describing whether the square is dark or light. For squares which are only partially dark, a judgment decision is made. In this manner, a set of data can be obtained which describes the letter in machine language, and this data is stored in disc memory 12. The process is repeated for all letters, symbols, logos, etc., of any particular font style. It is noted that although memory 12 is herein generally referred to as a disc memory; that any suitable memory device, such as a "charge coupled" type memory, may be used therefor.

For the letter G shown in FIG. 5, the border 28 provides a reference for the address of the various segments comprising the letter. Detail A of FIG. 5 is shown in FIG. 6 and it more clearly illustrates how the letter is defined by a plurality of data entries.

Returning now to the operation of the system of FIG. 1, the type to be set is read from paper or magnetic tape by data input device 18. The tape is prepared by a suitable composing machine (not shown) which is known in the art. The first information on the tape may be a code which identifies which font style is to be used; and in response to this data, computer processor unit 10 enters the disc memory, retrieves the required font style, and the font in code form is stored in font memory 14. Font memory 14 is preferrably a random access memory (RAM) so that the data to construct any called for letter can be quickly retrieved.

The next data read from data input device 18 is a code for the first letter to be set. Computer processor unit 10 locates the letter in font memory 14 and transfers the data to output memory 16, which also may be a random access memory. Computer processor unit 10 fetches the next letter to be set from font memory 14 and transfers the data to output memory 16; and this process continues until a whole line of letters is assembled in output memory 16. If the maximum size to be set is 72 pt., (about one inch high), the line length is 10 inches and a resolution of 0.001 inches is desired, then output memory 16 would be approximately a 10 million bit device.

To continue the description of the system's operation, after a line of characters have been stored in output memory 16, computer processor unit 10 instructs output memory 16 to place upon its output lines the first "slice" of data, which is the top row of data that defines the first line of type. For example, the data for one line stored in the output memory might have the below illustrated format:

| | line length | |
|---|---|---|
| | ←—10,000 bits—→ | |
| 1000 bits ↓ | 10101 01010 | 0101 1010 |
| | . . . | . . . |
| | 1101 0010 1111 | 10101 1111 0010 |

Figure 2:
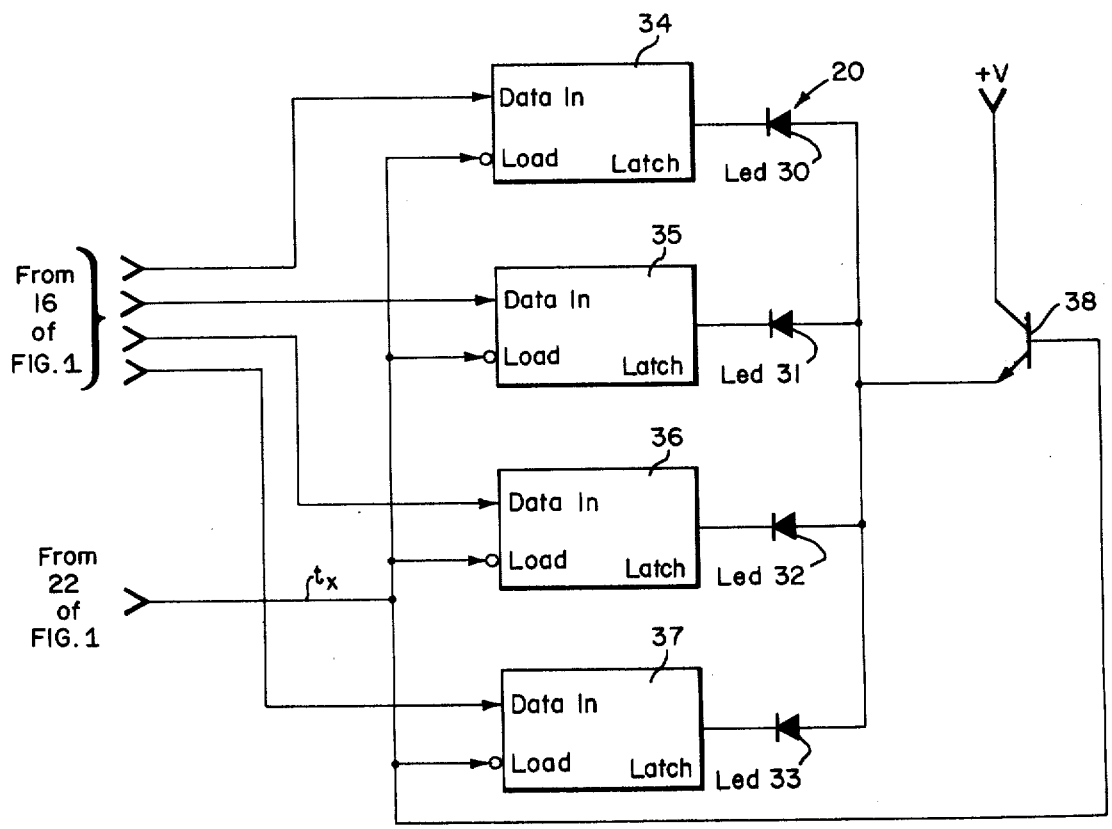
FIG. 2 is a block and schematic diagram of circuits which control the excitation of the light emitting diode (LED) array shown in FIG. 1.

FIG. 2 shows the drive circuits for LED array 20, and reference is momentarily directed thereto. It is noted that although only four channels are shown for clarity of the drawing that, for example, 10,000 such channels may be used in the system of FIG. 1. In FIG. 2, LEDS 30–33 are controlled by latch circuits 34–37 respectively. A row of data is loaded from output memory 16 to the respective latch circuits during the time interval that the timing output signal tx goes low and during this time interval drive transistor 38 is turned off, and the paper transport 26 (FIG. 1) is stepped to advance the photosensitive material one increment. After the latch circuits have had sufficient time to respond to the set or rest drive signals from output memory 16, signal tx goes high (eg + 4 volts) and drive transistor 38 is turned on so as to provide supply voltage +V to the anode terminals of each of the LEDs. The above described operation of drive transistor 38 greatly simplifies the implementation of the control circuits for the LED array. In the embodiment of FIG. 2, the respective LEDs are energized if their cathodes are at a low potential, eg zero volts; and they are not energized if their cathodes are at a high potential, eg +4 volts. In the above description of FIG. 2 the paper transport is described as being step driven during the time periods transistor 38 is turned off. It is noted however, that if desired, the paper transport maybe controlled to move the photosensitive material at a constant rate.

FIG. 3, to which reference is now directed, depicts the relationship between the output end 42 of the fiber optics tubes and the photosensitive material 39. It is again noted that although only 40 channels are shown in FIG. 3, that in a typical application of the present invention, thousands of such channels will be employed. FIG. 3 illustrates the illumination pattern for the very top of the letter G shown in FIG. 5. As the photosensitive material progresses, other fiber optic tubes will be illuminated and FIG. 6 shows more clearly the composition of the lines drawn. As previously discussed, drive transistor 38 is not conducting during the time the film is advancing. The spacing between the fiber optic tubes may be any selected value from zero up.

FIG. 4 shows the fiber optics assembly and it is noted that LED array 20 may be in any configuration which expedites the packaging of module 40 including the associated electronic drive circuitry. The input ends of fiber optics array 24 are bonded or otherwise attached to the light emitters protective coating or directly to the emitting surface. The output ends of fiber optics array 24 are arranged in some array (linear array shown) across end 42 of module 40. The module may be made of any material, such as epoxy; and as an aid to handling the fiber optics elements the module may be chemically etched with grooves (not shown) adapted to receive the fiber optic tubes. After attaching the fiber optic tubes or elements with a suitable bonding agent, a protective piece of material is placed on top of the elements. Module 40 may also include the drive circuitry of FIG. 2 (not shown in FIG. 4) in discrete component form or in an integrated circuit configuration; and the light emitting diodes may be part of a large scale integrated circuit configuration which includes the drive circuitry.

The fiber optics tubes of array 24 may be coated with a suitable opaque substance to enhance their operation and to ease handling and assembly problems. It is again noted that the output end of the fiber optic tubes need not be of the same size or arranged in the same configuration as their input ends and that typically the input ends will be five or more times larger in diameter than the output ends. The output ends of fiber optics array 24 are encapsulated in a suitable material such as epoxy and rendered smooth by machining or the like. So as to reduce light scattering and leakage, the fiber output assembly is caused to be placed in intimate contact with photosensitive material 40 by means (not shown) for maintaining pressure therebetween.

It is understood that the above-described embodiment is merely illustrative of the many possible specific embodiments which can represent applications of the principles of the present invention. Numerous and varied other arrangements can be readily devised in accordance with these principles by those skilled in the art without departing from the spirit and scope of the invention.

What we claimed is:

1. A typesetting system for recording information on a photosensitive material, comprising:
    a plurality of light emitting diodes arrranged in a nonlinear configuration;
    a plurality of fiber optic tubes with the input ends of said fiber optic tubes being coupled to respective ones of said light emitting diodes and with the output ends of said fiber optic tubes being arranged in a linear array and wherein the cross-sectional area of the input end of each of said fiber optic tubes is substantially larger than its output end, whereby the resolution of the recorded information and the configuration of the output ends of said fiber optic tubes is independent of the size and arrangement of said light emitting diodes;
    transport means for causing the photosensitve material to be passed by the output end of the fiber optic tubes;
    drive circuit means for simultaneously controlling the activation of each of said light emitting diodes in response to applied respective data signals, said drive circuit means including a plurality of latch circuits coupled to one terminal of respective light emitting diodes and a switch circuit coupled between a potential source and the other terminal of each of said light emitting diodes; and
    computer means for providing said data signals so as to cause said light emitting diodes to be controlled such that said information is recorded on said photosensitive material by the time modulation of said plurality of light emitting diodes as said photosensitive material is passed by the output end of said fiber optic tubes; said computer means including means for sequentially loading data into said latch circuits and for controlling said switch circuit during said data loading intervals such that the connections between the potential source and the other terminal of each of said light emitting diodes is interrupted.

2. The system of claim 1 wherein said transport means is controlled by said computer means so as to cause said photosensitive material to be advanced past the output ends of said fiber optic tubes only during said data loading intervals.

3. A system for recording information on a photosensitive material, comprising:
    a plurality of light emitting diodes;
    a plurality of fiber optic tubes with the input ends of said fiber optic tubes being coupled to respective ones of said light emitting diodes and with the output ends of said fiber optic tubes being arranged in a configuration different from the configuration of said plurality of light emitting diodes;
    transport means for causing the photosensitive material to be passed by the output ends of the fiber optic tubes;
    drive circuit means for simultaneously controlling the activation of each of said light emitting diodes in response to applied respective data signals, said drive circuit means including a plurality of latch circuits coupled to one terminal of respective light emitting diodes and a switch circuit coupled between a potential source and the other terminal of each of said light emitting diodes; and
    computer means for providing said data signals so as to cause said light emitting diodes to be controlled such that said information is recorded on said photosensitive material by the time modulation of said plurality of light emitting diodes as said photosensitive material is passed by the output ends of said fiber optic tubes, said computer means including means for sequentially loading data into said latch circuits and for controlling said switch circuit during said data loading intervals such that the connection between the potential source and the other terminal of each of said light emitting diodes is interrupted.

4. The system of claim 3 wherein said transport means is controlled by said computer so as to cause said photosensitive material to be advanced past the output ends of said fiber optic tubes only during said data loading intervals.

5. A system for recording information on a photosensitive material comprising:
- a plurality of light emitting diodes;
- a plurality of fiber optic tubes having their input ends coupled to respective ones of said light emitting diodes and having their output ends arranged in a linear array, and wherein the cross-sectional area of the input ends of said fiber optic tubes is different than that of their output ends whereby the resolution of the recorded information is independent of the size of said light emitting diodes;
- transport control means for causing the photosensitive material to be passed by the output ends of the fiber optic tubes;
- drive circuit means for simultaneously controlling the activation of each of said light emitting diodes in response to applied respective binary signals, said drive circuit means including a plurality of latch circuits each of which has a data input terminal coupled to receive a respective one of said binary signals and an output circuit coupled to one terminal of respective ones of said light emitting diodes; and said drive circuit means further including a switch circuit coupled between a potential source and the other terminal of each of said light emitting diodes; and
- computer means for sequentially producing matrices of rows and coumns of binary signals such that each matrix is representative of one line of the data to be recorded and with each row of the matrix comprising a number of binary bits equal to the number of said light emitting diodes and for sequentially applying, a row at a time, said binary signals to the data input terminals of said latch circuits whereby the activation of each light emitting diode is controlled in accordance with the binary state of the signal last applied to the data input terminal of an associated one of said latch circuits; and for controlling said switch circuit during successive load intervals in which said binary signals are loaded into said latch circuits, so as to interrupt the connection between said potential source and said light emitting diodes.

6. The system of claim 5 wherein said transport control means is controlled by said computer so as to cause said photosensitive material to be advanced past the output ends of said fiber optics tubes only during said load intervals.

7. A system for recording information on a photosensitive material comprising:
- a plurality of light emitting diodes;
- a plurality of fiber optic tubes having their input ends coupled to respective ones of said light emitting diodes and having their output ends arranged in an array of a selected configuration;
- transport control means for causing the photosensitive material to be passed by the output ends of the fiber optic tubes;
- a plurality of latch circuits each of which has a data input terminal coupled to receive an applied binary signal and an output circuit coupled to one terminal of respective ones of said light emitting diodes;
- a switch circuit coupled between a potential source and the other terminal of each of said light emitting diodes; and
- computer means for sequentially producing matrices of rows and columns of binary signals such that each matrix is representative of one line of the data to be recorded and with each row of the matrix comprising a number of binary bits equal to the number of said light emitting diodes and for sequentially applying, a row at a time, said binary signals to the data input terminals of said latch circuits whereby the activation of each light emitting diode is controlled in accordance with the binary state of the signal last applied to the data input terminal of an associated one of said latch circuits; and for controlling said switch circuit during successive load intervals in which said binary signals are loaded into said latch circuits, so as to interrupt the connection between said potential source and said light emitting diodes.

* * * * *